Jan. 13, 1953 — L. E. CLARK ET AL — 2,625,072
APPARATUS AND METHOD FOR EVALUATION
OF PHOTOGRAPHIC RESOLVING POWER
Filed March 9, 1949
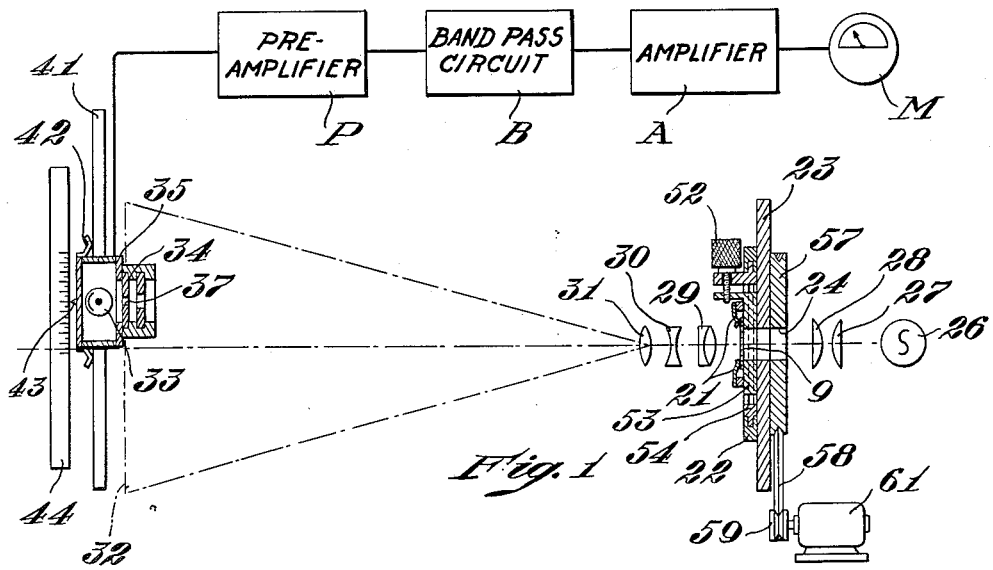
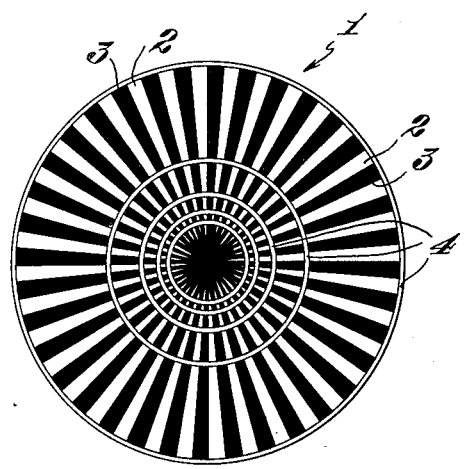
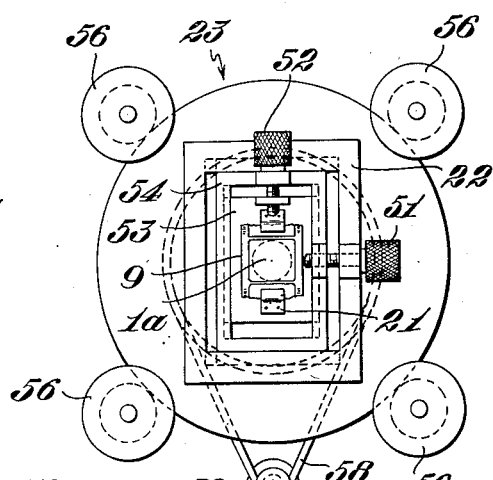
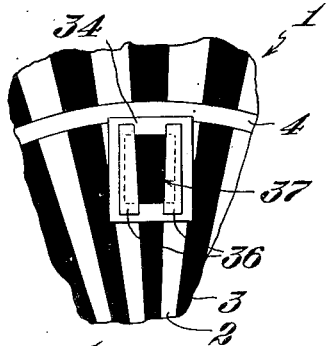
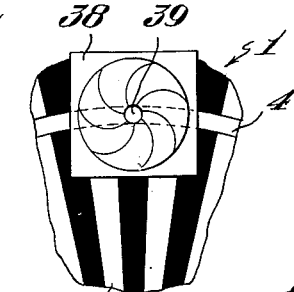
Inventors
Donald H. Kelly
Lauriston E. Clark
by Roberts, Cushman & Grover
Att'ys Patented Jan. 13, 1953

2,625,072

UNITED STATES PATENT OFFICE 2,625,072

APPARATUS AND METHOD FOR EVALUATION OF PHOTOGRAPHIC RESOLVING POWER

Lauriston E. Clark and Donald H. Kelly, Los Angeles, Calif., assignors to Technicolor Motion Picture Corporation, Los Angeles, Calif., a corporation of Maine Application March 9, 1949, Serial No. 80,388

7 Claims. (Cl. 88—14)

This invention relates to the art of measuring the resolving power of a photographic recording medium such as a photosensitive emulsion or a printing dye carried on a film, paper or other support. The resolving power of a medium refers to its ability to define sharply fine detail in the image recorded therein and may be defined as the least distance or linear interval between two closely adjacent images or lines which can be rendered separately by the medium. The resolving power characteristic is usually expressed in the number of lines per millimeter which the medium can reproduce clearly.

Measurement of this characteristic is of great value throughout photographic processing as an indication of picture definition and performance of various optical and chemical techniques. Previously resolving power has been determined by photographing a test object or target composed of parallel lines of different spacing or a fan-shaped grating, and examining the recorded target visually with a microscope to determine the smallest spacing or interval between lines which is not dissolved in the pattern of elementary particles of the medium. This determination involves the ocular contrast criterion, one of the most unreliable of the visual thresholds. Furthermore in making such a measurement extreme care must be used in maintaining constant illumination level, specularity of light and magnification throughout the measurements. If the density of the medium is not reasonably uniform throughout the target area the possibility of human error is increased. Using this type of subjective determination two observers rarely agree on the same line spacing as the limit of the emulsion's resolution.

Objects of the present invention are to provide a way of measuring resolving power of a photographic medium which is completely objective, being independent of visual observation and the physical factors of illumination intensity, specularity and the density of the medium, which yields a quantitative measurement in lines per millimeter that is completely reproducible and capable of being correlated with the mean measurement of a large number of visual observations, and which is simple and efficient in operation.

In one aspect the invention involves apparatus for determining the resolving power of the photographic recording medium carried on a support, in which medium is reproduced an optical target having a plurality of alternately contrasting equiangular sectors, and comprises an optical system arranged to project an image of a portion of one of the sectors, a light-sensitive element in the plane of that image, means for producing relative radial movement between the element and the center of the image, means for producing relative rotation between the support and the element about that axis so that portions of alternately light and dark value sectors fall on the light sensitive element, the element being responsive to alternate light values to produce an alternating current, and discriminating means for detecting a variation in a characteristic of the current whereby, as the photosensitive element is moved radially to or from a portion of the target where the lines are so closely spaced as not to be resolved by the recording medium, a substantial change in that charactertistic indicates the limit of the resolving power of the medium.

Near the center of the recorded target the sectors narrow to a width of the same order as the grains or granular groups of the recording medium. At this point both the sectors and the grains may have alternately contrasting light values so that both, when projected on the light sensitive element, will produce an alternating current. The component of that current produced by the sectors will be cyclic and of constant frequency whereas the component produced by the grains will be a succession of random pulses. As the photosensitive element is moved radially, the characteristics of these components will vary. For example, if as the element is moved from the center of the target the current is applied to an oscilloscope, the random pulses will at first predominate and as the limit of resolving power is passed, the cyclic wave form will replace the pulses. Or if the current were applied to a frequency meter responsive only to cyclic current the presence of the constant frequency component but not the random pulses would be detected. Preferably the current detector includes means for discriminating against either the random pulse component or the cyclic component, and the characteristic whose variation is detected is the amplitude of the cyclic or constant frequency component. Since the frequency of the current produced by the image of the target on the photosensitive element is constant and determined by the angle of the sectors and the speed of rotation of the target relative to the element, a frequency selective circuit having a narrow band pass may be connected between the element and the meter so that a change of the alternating current produced by the element will be indicated in the meter by a change in the amount of current passed by the circuit.

Preferably the optical system includes a mask fixed relative to the element, the mask having an aperture of such size that it passes less than the whole width of a sector at a portion of the sector which is narrower than the interval resolvable by the medium. The target may be rotated about its axis or the light-sensitive element may be moved in a circular path about the same axis. Similarly the element may be moved radially relative to the center of the image, or the image may be moved to produce the same relative movement.

To facilitate centering the target on the axis of rotation a light stop having an opening is disposed between a circular band in the target and the light-sensitive element, and adjusting means are provided on the rotating means to move the support relative to the rotational axis so that as it is rotated an image only of said band passes through the opening onto the element. If the recorded target is not centered, the eccentricity will allow images of the sectors to be projected intermittently through the opening onto the element causing it to produce an alternating current which will be indicated by the meter.

In a further aspect the invention involves the method of determining the resolving power of a photographic recording medium which comprises recording in the medium an optical target having a plurality of alternately contrasting equiangular sectors, projecting an image of a portion of one sector of the recorded target on the light-sensitive element, producing relative rotation between the support and the element about an axis through the center of the image, moving the element radially relative to said axis and detecting changes in a characteristic of the response of said element to alternately contrasting light values projected on the element.

In a still further aspect the invention involves an optical target to be reproduced in a photographic recording medium for rotary optical scanning which comprises a plurality of equiangular sectors disposed in a circle and having alternately light and dark light values, the target being of such size that the least interval clearly distinguishable between sectors of equal light value is less when reduced to recorded size than the least linear interval which can be resolved by said medium. Usually the least linear interval between alternate recorded sectors which can be resolved is determined by the maximum size of grain or granular groups in the medium.

The target may have a plurality of circular bands concentric with the circle formed by the sectors and intersecting said sectors at radial intervals which indicate the linear spacing of the sectors adjacent each band. When the target is rotatively scanned eccentric movement of the bands relative to the axis of scanning indicates that the target is not centered in the scanning system. Preferably the width of the bands is greater when reduced to recorded size than the greatest dimension of the granular groups in said medium, that is the least linear interval which can be resolved by the medium.

For the purpose of illustration a typical embodiment of the invention is illustrated in the accompanying drawings in which Fig. 1 is a schematic diagram of resolving power measuring apparatus;

Fig. 2 is an end elevation of part of the apparatus;

Fig. 3 is a plan view of an optical target; and

Figs. 4 and 5 are fragmentary views of the target shown in Fig. 3.

One type of optical target suitable for use in the resolving power measuring apparatus of Fig. 1 is illustrated in Fig. 3. The target 1 is prepared on any suitable background by drawing a circle with a number of equiangular sectors 2—3. Alternate sectors are given contrasting light values, preferably white and black. The size of the actual target to be photographed relative to the recorded size is determined with regard to the number of lines per millimeter which can be drawn distinctly on the background and the estimated maximum resolving power of the medium. The relation may be expressed as follows:

$$\frac{\text{Target size (mm.)}}{\text{Recorded size (mm.)}} = \frac{\text{Resolving power of medium (lines/mm.)}}{\text{Resolution of target (lines/mm.)}}$$

For instance if the target is to be reproduced in 16 mm. film having a useful area of about 11 mm. diameter, and the maximum resolving power of the reproducing medium coated on the film is known to be not greater than 100 lines per mm. then, if the maximum number of lines per mm. which can be distinctly drawn on the background for the target is 1, the target would be $$11 \frac{100 \text{ mm.}}{1}$$

or approximately one meter in diameter.

Although the target chosen for purposes of graphic illustration in Fig. 3 has thirty-six white and thirty-six black sectors, in actual practice a larger number of sectors are marked therein. The target when reduced to recorded size should have line spacings ranging upwardly from approximately twenty lines per mm. A recorded target 11.5 mm. in diameter and having 720 black and 720 white sectors would have a spacing of approximately twenty lines per mm. at its periphery, the spacing increasing to an infinite number of lines per mm. toward the center of the target.

Circular bands 4 are marked on the target at the periphery and at various radial distances from the center. The bands are concentric with the circle of sectors and are of such a width that when reduced to recorded size they will be wider than the least interval resolvable in the emulsion. A width of 0.01 mm. would be satisfactory on a film able to resolve less than 100 lines per mm. The radial distances at which the bands 4 are disposed are one-half, one-third, one-quarter and one-fifth the radius of the target. With such a radial spacing, the bands serve to indicate the linear spacing of the sectors as they converge. In the case of a 720 sector target with a spacing of 20 lines per mm. at the periphery, the spacing at one-half the radius would be 40 lines per mm.; at one-third radius, 60; at one-quarter radius, 80; and at one-fifth radius, 100 lines per mm.

After photographing the target on film, a single frame of film 9 carrying the image of the reduced target 1a is held by a pair of clamps 21 on slide 53 of a framework 22. The framework 22 in turn is fixed to a rotating stage 23. The framework 22 includes adjusting screws 51 and 52 for positioning slides 53 and 54 relative to the rotating stage 23. By means of the screws the slides 53 and 54 may be moved in two dimensions to position the film 9 relative to the framework. The stage is mounted at its periphery between the four rollers 56 and carries a sheave 57 connected by a belt 58 to the pulley 59 of an electric motor 61.

An opening 24 passing through the stage 23 and the framework 22 allows light from a lamp 26 to pass through the film 9. An optical system including lenses 27 to 31 projects the image of the recorded target illuminated by the lamp 26 forming an image in the plane 32 in the region of which lies a photoelectric tube 33 contained in a suitable housing 35. In the plane 32 is a mask 34 having adjustable shutters 36 for controlling the width of an aperture 37 and, adjacent the mask, an iris 38 having an adjustable opening 39. The housing 35 carrying the phototube, the mask and the iris, is slidably mounted on a track 41 and yieldingly held in position thereon by springs 42. A pointer 43 on the housing indicates the position of the phototube along the track on a scale 44 fixed relatively thereto.

The motor 61 turns the rotating stage 23 at constant speed, causing a portion of alternate sectors 2 and 3 to be projected on the phototube 33, thus causing it to produce an alternating current at a frequency predetermined by the number of sectors in the circle and the speed of revolution. The output of the phototube is applied to a preliminary amplifying stage P, thence to a narrow band pass circuit B, and to a second amplifier A which actuates a meter M. The band pass circuit is designed to pass alternating current only at the predetermined frequency, so that transient currents or random pulses produced by projection of granular groups in the medium will not be applied to the meter.

In operation a film having a target recorded in its emulsion is mounted by the clamps 21 on the stage 23. The housing for the phototube is then positioned so that an image of one of the circular bands 4 is projected through the aperture 39 of the iris 38. The iris opening 39 is then adjusted so that it passes an image of the band 4 only and not portions of the adjacent contrasting sectors 2 or 3. The stage 23 is then rotated by means of the electric motor 61 causing the image of the circular band 4 to rotate. The image of the band falling on the phototube produces a steady response in the phototube. However, if the target 1a recorded in the film fragment 9 is not centered on the axis of rotation of the stage 23 the eccentric motion of the recorded target and the image will cause an image of the contrasting sectors to fall intermittently on the opening 39. As the image of the rotating sectors 2 and 3 falls on the phototube, the phototube will respond to produce an alternating current which will be indicated by the meter M. The adjusting screws 51 and 52 are then adjusted to center the image 1a of the target on the axis of rotation of the stage 23. When the target recorded is centered the output of the phototube as indicated by the meter will be zero.

The opening 39 of the iris 38 is then expanded so that no part of the wedge-shaped aperture of the mask 34 is covered. The shutters 36 are adjusted micrometrically so that the aperture 37 is less wide than the image of the narrowest resolvable portion of a sector 2 or 3. For example, if the target is recorded in the medium having an estimated resolving power of less than 100 lines per mm., that is, the least resolvable interval is about 0.02 mm., and the degree of magnification of the optical system is two hundred times, then the aperture opening will be less than 200×0.02 mm., for example one millimeter. An alternate method of adjusting the aperture of the mask is as follows: The photocell is moved on the track 41 until it is near the center of the projected image of the target 1a. The aperture is then decreased until further narrowing does not increase the output of the photocell indicated by the meter. Smaller magnifications and slit widths may be used, since diffraction effects at the slit will not affect the measurement provided the entire image still falls on the cathode of the photosensitive tube.

The tube is then moved back to the circumference of the target image and the alternating current output of the meter noted. Radial movement in this portion of the image will not affect the output appreciably. But as the tube is returned towards the center of the target the output will begin to drop rapidly as the size of the image of sectors approaches the size of the emulsion grain or granular groups. In this position of the phototube the image of the sectors is so narrow that the emulsion is unable to resolve them. If the phototube is moved further towards the center the current produced by it will be at an irregular rate at which the image of the emulsion grains or granular groups is falling on the target. This frequency is so irregular, or at least so different from the frequency with which alternate sectors are projected on the tube, that it will not be passed through the frequency selective circuit and consequently will not be indicated on the meter.

The radial displacement of the phototube from the axis of rotation, i. e., the center of the image, may be read on the scale 44, which indicates the spacing in lines per millimeter of the portion of the recorded target projected on the phototube in the particular position.

The criterion for determining when this reading should be taken preferably should be chosen for good correlation with the visual contrast method of determining resolving power. For example, the point where the meter indicates a 50%, or minus 6 db decrease in the output of the phototube might be at the displacement position of the phototube indicating a limit resolving power comparable to that determined by visual contrast. Probably the criterion will be a change in the order of a minus 20 db in the output of the phototube as compared with the maximum output generated near the periphery of the target.

The accuracy of this device is limited only by the accuracy of measurement of relative amplitude of the phototube output. The sensitivity of the system will increase as the tube is moved from the periphery toward the center of the target owing to the fact that the light input to the tube changes from a square wave where the mask aperture width is appreciably less than the width of a sector to a sine wave as the aperture is moved toward the center where the spacing of the sector's images approaches that of the aperture. Modulation due to eccentricity of the stage is eliminated by filtering out all frequencies except that produced by the sectors. This system has the further advantage that it will determine the average value for a relatively large area of the film, which the visual contrast method, involving examination of a small portion of the film ordinarily will not.

It should be understood that the present disclosure is for the purpose of illustration only and that this invention includes all modifications and equivalents which fall within the scope of the appended claims.

We claim:

1. Apparatus for determining the resolving power of a photographic recording medium comprising a photograph of an optical target having a plurality of alternately contrasting equiangular sectors disposed in a circle, a support for said photograph, an optical system for projecting an image of the photographed target, a light sensitive element in the region of the plane of the image for producing alternating current in response to light variations, means for producing relative radial movement between the element and the center of the image, means for producing relative rotation between the support and the element about an axis through said center, the element being responsive to alternately contrasting light values projected thereon to produce an alternating current of constant predetermined frequency, discriminating means passing said predetermined frequency only, and means for detecting changes in the amplitude of the constant frequency current whereby substantial change in said amplitude, as the element is moved radially, indicates the limit of resolving power of the medium.

2. Apparatus for determining the resolving power of a photographic recording medium comprising a photograph of an optical target having a plurality of alternately contrasting equiangular sectors disposed in a circle, a support for said photograph, an optical system for projecting an image of a portion of one sector, a light sensitive element in the region of the plane of the image for producing alternating current in response to light variations, means for producing relative radial movement between the element and the center of the image, means for producing relative rotation between the support and the element about an axis through said center, the element being responsive to alternately contrasting sectors projected thereon to produce an alternating current of constant predetermined frequency, a frequency selective circuit passing only alternating current of said constant frequency, and a meter for detecting changes in the amplitude of the constant frequency current, whereby substantial change in said amplitude as the element is moved radially indicates the limit of the resolving power of the medium.

3. Apparatus for determining the resolving power of a photographic recording medium comprising a photograph of an optical target having a plurality of alternately contrasting equiangular sectors and a circular band concentric with said sectors, a support for said photograph, an optical system for projecting an image of a portion of one sector, a light sensitive element in the region of the plane of the image producing alternating current in response to light variations, means for producing relative radial movement between the element and the center of said image, means for producing relative rotation between the support and the element, adjustable means for centering the image on the axis of said rotation, a light stop having an opening disposable between the support and said image and fixed relative to the element, the opening having a diameter less than the width of the image of said band, said element being responsive to alternately contrasting light values projected through said opening to produce a constant frequency alternating current, means actuated by said element for passing said constant frequency only, and means for detecting the constant frequency current response thereof, whereby the target image may be centered on the axis of rotation by adjusting the centering means until an image of the band only is projected on the element and accordingly the detecting means indicates no response of the element.

4. Apparatus for determining the resolving power of a photographic medium comprising a photograph of an optical target having a plurality of alternately contrasting equiangular sectors disposed in a circle, a light sensitive element producing alternating current in response to light variations, means for rotatively scanning said medium with said element about the center of said circle so as to produce an alternating current in said element having a constant frequency component, means for producing relative radial movement between said element and the center of said circle, discriminating means passing said constant frequency component only, and means for detecting changes in a characteristic of said constant frequency component, whereby substantial change in said characteristic during said radial movement indicates the limit of resolving power of the medium.

5. Apparatus for determining the resolving power of a photographic recording medium comprising a photograph of an optical target having a plurality of alternately contrasting equiangular sectors disposed in a circle, a support for said photograph, an optical system for projecting an image of a portion of one sector, a light sensitive element in the region of the plane of the image producing alternating current in response to light variations, means for producing relative radial movement between the element and the center of the image, means for producing relative rotation between the support and the element about an axis through said center, the element being responsive to alternately contrasting sectors projected thereon to produce an alternating current having a component of constant predetermined frequency proportional to the product of the number of said sectors in said circle and the rate of revolution of said means, a frequency selective circuit passing only alternating current of said predetermined frequency, and a meter for detecting changes in the amplitude of the constant frequency current, whereby substantial change in said amplitude as the element is moved radially indicates the limit of the resolving power of the medium.

6. The method of determining the resolving power of a photographic recording medium carried on a support which comprises photographing in said medium an optical target having a plurality of alternately contrasting equiangular sectors disposed in a circle, projecting an image of a portion of one sector of the photographed target on a light sensitive element, producing relative rotation between the support and the element about an axis through the center of said image, thereby generating an electric current having a constant frequency component dependent on the number of sectors in said circle and the rate of said rotation, moving said element radially relative to said center and detecting changes in a characteristic of said constant frequency component only, whereby substantial change in said characteristic as said element is moved radially indicates the limit of the resolving power of the medium.

7. The method of determining the resolving power of a photographic recording medium carried on a support which comprises photographing in said medium an optical target having a plurality of alternately contrasting equiangular sectors disposed in a circle, projecting an image of a portion of one sector of the photographed target on a light sensitive element, producing relative rotation between the support and the element about an axis through the center of said image thereby generating in said element a current having a constant frequency component dependent on the number of sectors in said circle and the rate of said rotation, filtering out current other than said constant frequency component, moving said element radially relative to said center, and detecting changes in the amplitude of said component, whereby substantial change in said amplitude as said element is moved radially indicates the limit of the resolving power of the medium.

LAURISTON E. CLARK.
DONALD H. KELLY.

REFERENCES CITED

The following references are of record in the file of this patent:

UNITED STATES PATENTS

| Number | Name | Date |
| --- | --- | --- |
| 1,998,461 | Kucher | Apr. 23, 1935 |
| 2,198,971 | Neufeld | Apr. 30, 1940 |
| 2,361,447 | Baker | Oct. 31, 1944 |
| 2,380,244 | Jones et al. | July 10, 1945 |
| 2,398,238 | McNatt | Apr. 9, 1946 |
| 2,460,060 | Butler | Jan. 25, 1949 |
| 2,464,892 | Roehrl | Mar. 22, 1949 |
| 2,468,690 | Schweisthal | Apr. 26, 1949 |
| 2,469,935 | Sweet | May 10, 1949 |
| 2,488,430 | Offner | Nov. 15, 1949 |
| 2,494,441 | Hillier | Jan. 10, 1950 |
| 2,505,316 | Wilmotte et al. | Apr. 25, 1950 |